May 28, 1968  C. L. THOMPSON  3,385,314
VALVE APPARATUS
Filed Feb. 25, 1966  6 Sheets-Sheet 1

INVENTOR.
CHARLES L. THOMPSON
BY
Brown, Birch, Swindler and McKie
ATTORNEYS

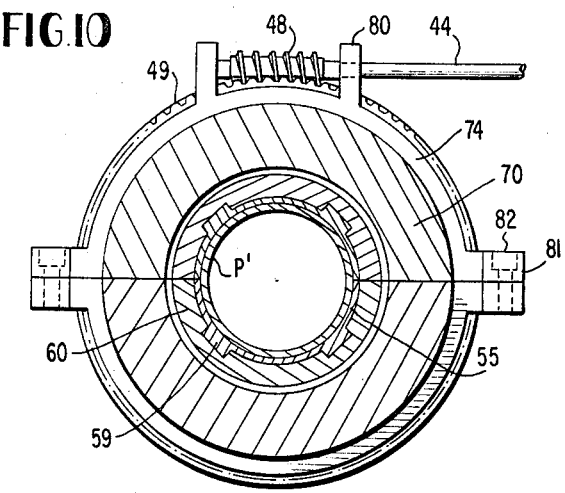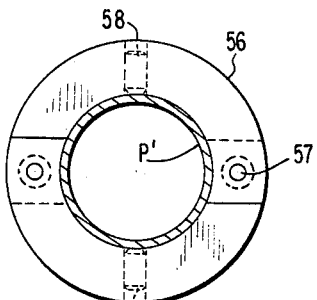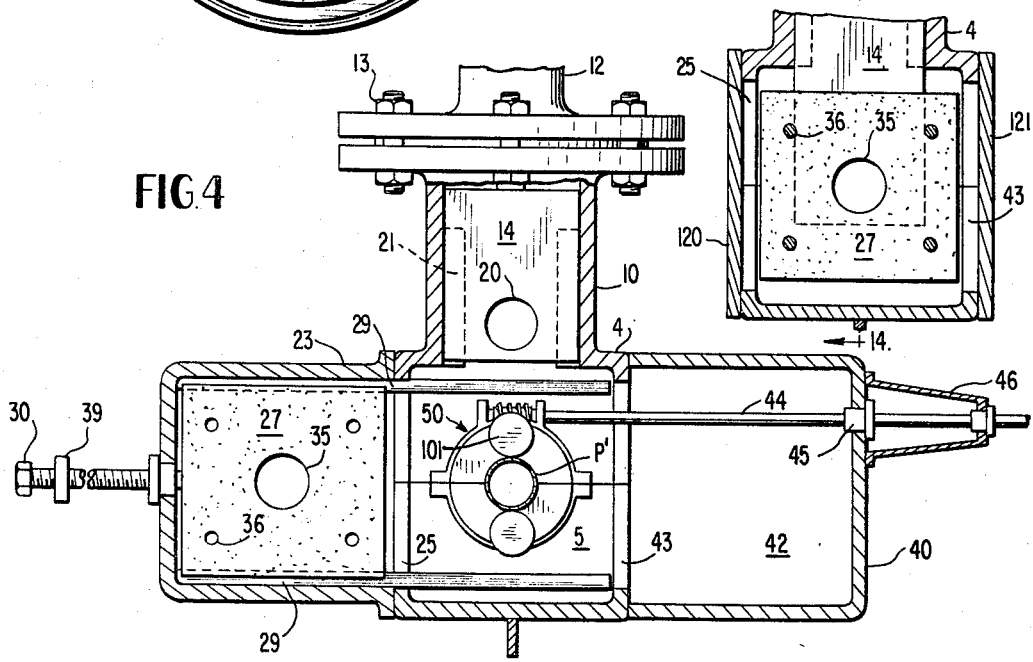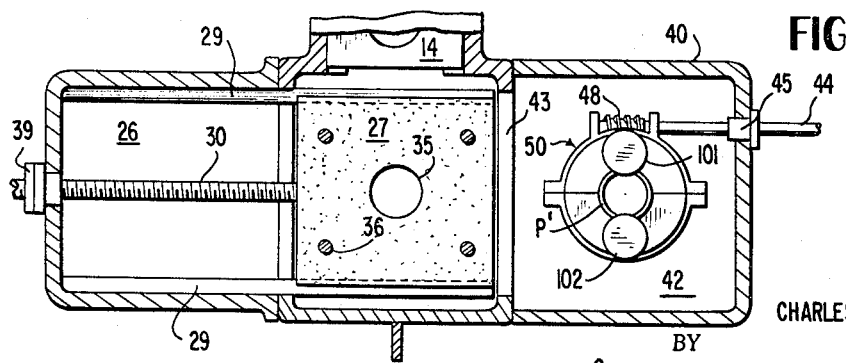

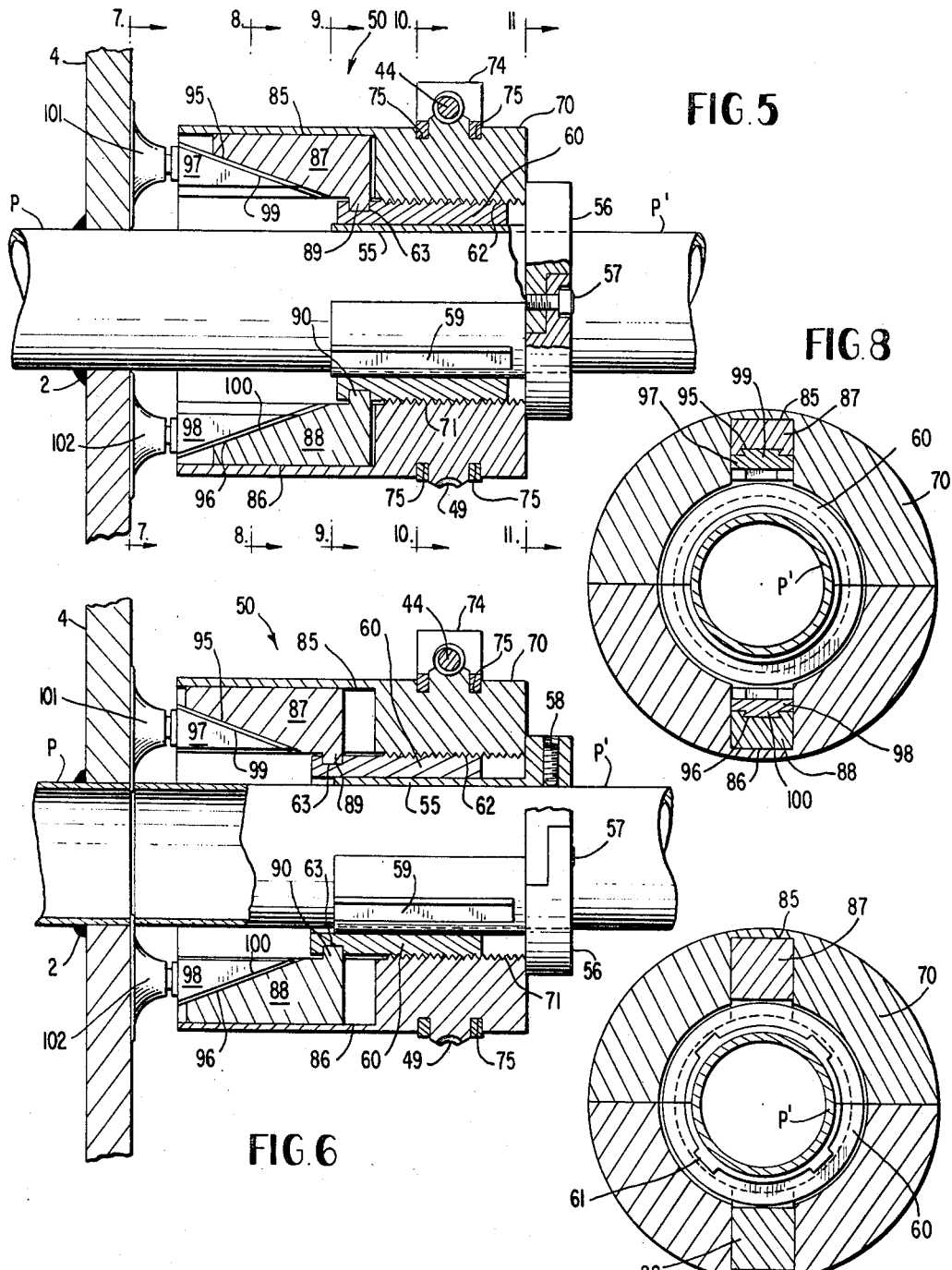

May 28, 1968  C. L. THOMPSON  3,385,314
VALVE APPARATUS

Filed Feb. 25, 1966  6 Sheets-Sheet 4

INVENTOR.
CHARLES L. THOMPSON

BY  ATTORNEYS.

May 28, 1968     C. L. THOMPSON     3,385,314
VALVE APPARATUS

Filed Feb. 25, 1966     6 Sheets-Sheet 5

INVENTOR.
CHARLES L. THOMPSON

BY     ATTORNEYS.

May 28, 1968 C. L. THOMPSON 3,385,314
VALVE APPARATUS
Filed Feb. 25, 1966 6 Sheets-Sheet 6

INVENTOR
CHARLES L. THOMPSON

BY Irons, Birch, Swindler & McKie

ATTORNEYS.

3,385,314
VALVE APPARATUS
Charles L. Thompson, Pampa, Tex.
(3341 Vivian Court, Wheatridge, Colo. 80033)
Continuation-in-part of application Ser. No. 367,524,
May 14, 1964. This application Feb. 25, 1966, Ser.
No. 534,959
22 Claims. (Cl. 137—318)

ABSTRACT OF THE DISCLOSURE

Apparatus for installing valves in pipelines while the pipelines are in operation and under pressure without any significant loss of the product flowing therethrough. A valve body is assembled about the pipeline having a compartment through which the pipeline extends, a portion defining a valve housing having a valve therein, a housing for a pipeline cutter, and housing for a valve seat, all of which are impervious to fluid. The pipeline is cut and the cutter and cut pipeline section retracted into its respective housing. The valve seats are then moved into alignment with the severed pipeline and the valve is lowered into seating position. The housing for the cutter and for the valve seats can then be replaced with permanent fluid-tight walls.

This is a continuation-in-part of my co-pending application Ser. No. 367,524 filed May 14, 1964, now abandoned.

This invention relates generally to apparatus for installation of valves in pipelines and more particularly, to an improved apparatus for installing valves in pipelines while the pipelines are in operation and under pressure.

In many instances it has become necessary to install additional valves in pipelines for flow control and the like, after the line has been put into service. There is thus a great need, particularly in the oil and gas industry, for a device with which a valve can be installed in a line quickly and efficiently without discontinuing or interrupting the operation of the line, and without any significant loss of the product flowing therethrough.

Heretofore known apparatus for installing valves in operating pipelines has proven unsatisfactory, particularly because of the difficulty in placing the valve seats and valves in proper position on the pipeline without a substantial loss of the product flowing through the line. Valve installation with prior apparatus has further proven to be slow and cumbersome because of the inefficiency of the pipe cutters employed in conjunction with such devices to sever the line and allow the valve to be placed in the pipeline flow path.

Therefore, it is the primary object of this invention to provide improved apparatus for installing valves in pipelines.

It is another important object of this invention to provide improved apparatus for installing a valve in a pipeline while the line is in operation and under pressure, without interrupting the continuous operation of the line, and without any significant loss of product flowing through the line.

It is a further object of this invention to provide apparatus for installing a valve in a pipeline, while the line is operating under pressure, which requires a minimum of time and skill to assemble, is easy to install, durable in operation, and relatively inexpensive to manufacture.

It is a further object of this invention to provide apparatus for installing a valve in a pipeline while the line is operating under pressure, which apparatus includes improved pipe cutting means to quickly and efficiently sever the pipeline and allow placement of the valve.

It is an additional object of this invention to provide an improved pipeline cutting device usable in apparatus for installing valves in pipelines.

It is a still further object of this invention to provide an improved pipeline cutting device which is compact, and which can be easily mounted on the pipeline to sever the pipe quickly and efficiently.

This invention may generally be described as apparatus for installing a valve in a pipeline comprising the combination of a valve body, said body being separable into parts to permit assembly about said pipeline in fluid-impervious relationship therewith, a first portion of said body defining a compartment through which said pipeline may extend, a second portion of said body defining a valve housing in communication with said first portion, valve means mounted in said valve housing and movable into said compartment, a cutter housing connected to said body defining a fluid-tight first chamber in communication with said compartment, pipe cutting means engageable in cutting relationship with the pipeline within said compartment to sever a section of said pipeline, means to retract said pipe cutting means and the severed section of said pipeline into said cutter housing, a valve seat housing connected to said body defining a fluid-tight second chamber in communication with said compartment, valve seat means movably mounted within said second chamber, said seat means containing an aperture for coaxial alignment with the said pipeline, means operable from the exterior of said valve seat housing to move said seat means into said compartment to permit said aperture to be coaxially aligned with said pipeline after said section of said pipeline is severed and removed therefrom, and means to retain said seat means within said compartment in coaxial alignment with said pipeline so that said seat means receives said valve means within said compartment to form a fluid-tight valve in said pipeline.

The improved pipeline cutting device usable in apparatus for installing valves in pipelines may generally be described as a combination comprising an annular member removably securable to the pipeline, said member including means for rotating said member about said pipeline, a cutter support with a cutting blade attached thereto, said cutter support maintaining said cutting blade in engagement with the pipeline and being connected to said member for rotation thereby, said member including camming means engaged with said cutter support to cam said cutting blades radially into said pipeline as said member is rotated about the pipeline.

Specific objects and features of this invention will now be described with reference to the drawings wherein:

FIGURE 4 is a partial sectional view taken along line 4—4 of FIGURE 1, with the valve seats in the original position before the pipeline is severed;

FIGURE 5 is a sectional view illustrating one embodiment of the improved pipe cutter mounted upon the pipeline in a position to begin cutting;

FIGURE 6 illustrates the pipe cutter as shown in FIGURE 5 immediately after the pipeline has been severed;

FIGURE 8 is a sectional view taken along the line 8—8 in FIGURE 5;

FIGURE 9 is a sectional view taken along the line 9—9 in FIGURE 5;

FIGURE 10 is a sectional view taken along the line 10—10 of FIGURE 5;

FIGURE 11 is a sectional view taken along the line 11—11 of FIGURE 5;

FIGURE 12 is a partial sectional view of the apparatus in FIGURE 4 and illustrates placement of the valve seats in alignment with the pipeline with the cutter and severed pipe section withdrawn;

FIGURE 13 is a partial sectional view showing the valve seats and valve installed in the pipeline, with closure plates attached to the side of the valve body, after the installation of the valve is completed;

A first embodiment of the invention, as illustrated in FIGURES 1 through 14, will now be fully described.

Figure 1:
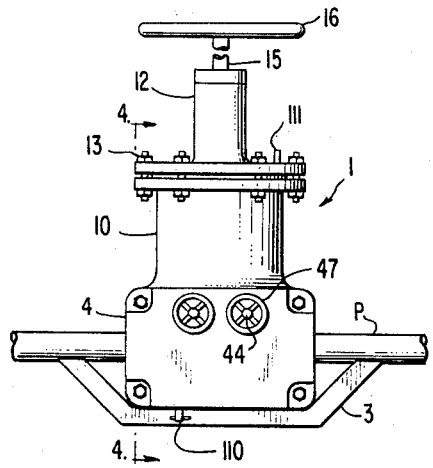
FIGURE 1 is a front elevation of the apparatus mounted in place on the pipeline in which the valve is to be installed.
Figure 3:
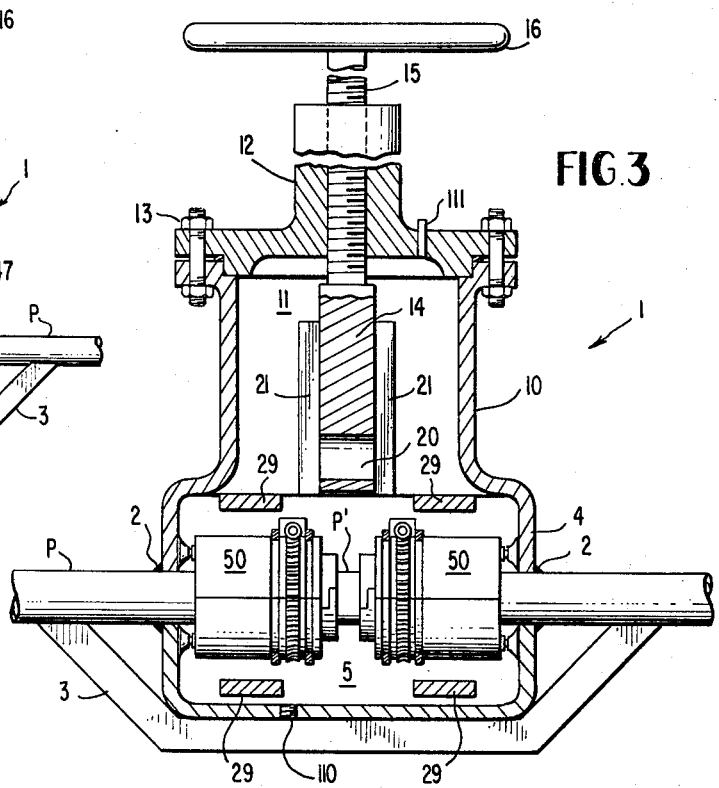
FIGURE 3 is a partial sectional view of the apparatus as shown in FIGURE 1, showing the valve in the upper position and showing one embodiment of the pipe cutters in place on the pipeline.
Figure 2:
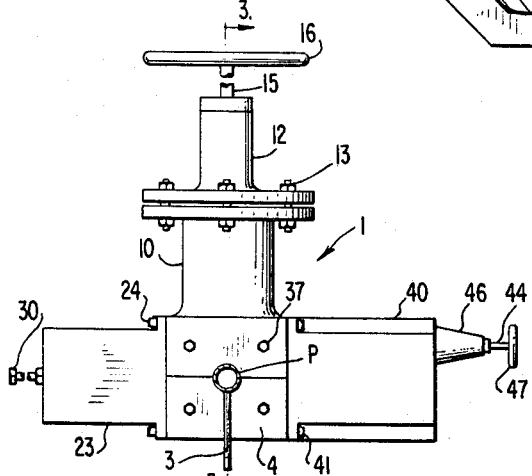
FIGURE 2 is the left end view of the apparatus shown in FIGURE 1.

Referring initially to FIGURE 1, a valve body, generally indicated by the numeral 1, is mounted at the desired location upon pipeline P in which the valve is to be installed. Valve body 1 is separable into parts, such as along the centerline of the pipeline P, to allow its placement about the pipeline in fluid-impervious relationship therewith. After mounting on the pipeline, the split portions of the valve body may be joined in any suitable manner, not shown, and the body 1 may be permanently connected to the pipeline, such as by welds 2, as shown in FIGURE 3. A gusset strap 3 may be welded to pipeline P, as shown clearly in FIGURES 1 and 3, to increase the rigidity of the apparatus and to retain the ends of the pipeline in proper alignment after a section of the pipe is cut out, as more fully described hereinafter.

With valve body 1 in place on the pipeline, the first body portion 4 defines a compartment 5 through which a section P' of the pipeline extends. Except for the openings 25 and 43 in the side walls of the first body portion 4, as indicated in FIGURE 4, this compartment 5 encloses pipe section P'. The second body portion 10 of the valve body defines a valve housing 11 (FIGURES 1 and 3) in communication with compartment 5. The top of valve body 1 may include a cap 12 secured to the body, in a fluid-tight arrangement, by fasteners 13. Cap 12 is thus removable to allow inspection and service of the valve apparatus if such becomes necessary.

Valve means are movably mounted within the valve housing 11 above compartment 5. In FIGURE 3, the valve means shown is a wedge type valve plate 14 containing an aperture 20, which is aligned with pipeline P when the valve is opened. The valve plate 14 is movably mounted in the valve housing 11, transverse to the pipeline, by connection with valve stem 15, which threadably cap 12 and extends above the valve body 1. Handle 16 is secured to the upper end of stem 15 to allow manual operation of the valve. By turning handle 16, valve means 14 may be moved into compartment 5 in axial alignment with pipeline P. Channel guides 21, as shown in FIGURES 3 and 4, maintain the valve plate 14 in proper position in valve housing 11 and insure accurate placement of the valve within compartment 5.

A valve seat housing 23 (FIGURES 2, 4, and 12) is removably connected to the first body portion 4 of the valve body 1 by bolts 24, in a fluid-tight arrangement, and extends away from the valve body in a direction generally transverse to pipeline P. Due to the opening 25 in the side of the first body portion 4, valve seat housing 23 defines a fluid-tight chamber 26 in communication with compartment 5.

Figure 14:
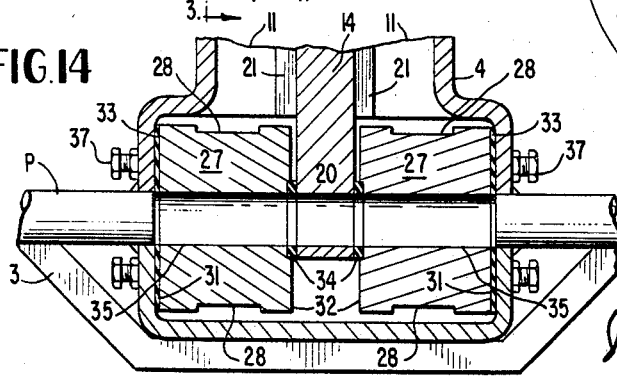
FIGURE 14 is a sectional view taken along line 14—14 in FIGURE 13.
Figure 7:
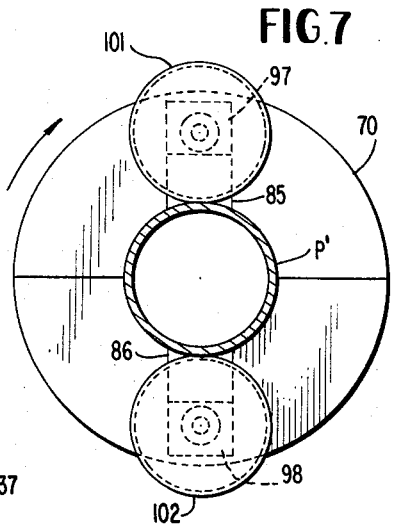
FIGURE 7 is a sectional view taken along the line 7—7 in FIGURE 5.

Valve seats 27 (FIGURE 4), preferably generally rectangular in shape, are movably mounted within chamber 26 on guide rails 29, which ride in grooves 28 in the valve seats (FIGURE 14). Guide rails 29 are secured to the inside of chamber 26, such as by welding, and, in this embodiment, extend through opening 25 into compartment 5 to insure accurate placement of the valve seats. Obviously, other functionally equivalent guide means can be provided within compartment 5 to position the valve seats therein without departing from this invention.

Valve seats 27 in this first embodiment contain apertures 35 which are to be coaxially aligned with pipeline P when the seats are moved inwardly into compartment 5 along guide rails 29. As best seen in FIGURE 14, when the seats are in compartment 5 the outer faces 31 of the seats 27 are closely adjacent to the first valve body portion 4, and the inner faces 32 are spaced to provide an opening to allow the valve plate 14 to be received therebetween. The outer faces 31 include threaded holes 36, as seen in FIGURE 4, which engage with bolts 37 extending through the first body portion, to secure the valve seats 27 in proper position within compartment 5. Sealing material, such as lead gasket 33 (FIGURE 14), can be plaecd between the outer faces 31 and the first body portion to make the connection fluid-impervious. In addition, a gasket 34 can be bonded to the inner face 32, encircling the apertures 35, to insure a fluid-tight connection between the valve seats 27 and the valve plate 14.

An actuator 30 threadably engages the valve seat housing 23 and extends therethrough to abut with the valve seats 27, as shown in FIGURE 4. When rotated from outside the seat housing the actuator advances the seats inwardly along guide rails 29 into position in compartment 5. A detent 39 can be provided on actuator 30 to stop the advance of the valve seats 27 when apertures 35 are aligned with the pipeline P.

A cutter housing 40 (FIGURES 2 and 4) is also removably connected to the first body portion 4 of the valve body 1, in a fluid-tight arrangement, by bolts 41 (FIGURE 2) and extends generally transverse to the pipeline P from the side of body 1 opposite the valve seat housing 23. Cutter housing 40 thus defines a fluid-tight chamber 42, which due to opening 43 in the body portion 4, is also in communication with compartment 5.

Rotatable shafts 44 (FIGURE 4) extend toward the compartment 5, preferably through the cutter housing 40. Any suitable bearing 45 can be positioned in the cutter housing to make a fluid-impervious connection between the housing and the shafts 44, and to allow the shafts 44 to be axially shifted within the chamber 42. Braces 46 are mounted on the outside of the cutter housing 40 to support the shafts, as seen in FIGURE 4, and handwheels 47 (FIGURE 1) are attached to the outer end of the shafts to permit manual rotation during the cutting operation. In the alternative, the outer ends of shafts 44 may be modified for rotation by a power tool, if desired. The inner ends of shafts 44 include worm gears 48 (FIGURE 10) which cooperate with a ring gear 49 on this first embodiment of the pipe cutters, which are generally indicated by the numeral 50.

Pipe cutters 50 are movably mounted upon pipe section P' within compartment 5 (FIGURE 3). In this embodiment of the pipeline cutting device of this invention, each cutter 50 is engageable with the pipeline to sever one end of pipe section P' when the shafts 44 are rotated and permits the removal of the severed section after the cutting is completed. The operation of shafts 44 simultaneously rotates the cutters 50 about pipe section P' and feeds the cutters into the pipe section to quickly sever the section P' from the pipeline. Since the operation and construction of both pipe cutters 50 of this first embodiment are similar, only one cutter will be described in detail.

In this first embodiment, each cutting device 50 comprises a split sleeve 55 which is mounted around section P' of the pipeline within compartment 5. This split sleeve 55 includes a collar 56 (FIGURE 5) on its inner end. Machine screws 57 extend through abutting portions of collar 56 to retain sleeve 55 on the pipe section. Set screws 58 (FIGURE 11) prevent the sleeve 55 from slipping along or rotating about the pipe section P'. Sleeve 55 also includes splines 59 (FIGURE 5) which are spaced around its periphery and extend generally parallel to pipe section P' on the outer end of the sleeve, as seen from FIGURE 10.

A threaded ring 60, also split, is mounted on pipe section P' around the split sleeve 55. Ring 60 includes spaced slots 61 (FIGURE 9) an its inside portion which engage with the splines 59 on the sleeves 55. Hence, ring 60 may slide axially along the pipe section P' on sleeve 55, but is prevented by splines 59 from rotating about the sleeve. The periphery of ring 60 includes threads 62, and a groove 63 encircles the ring near its outer end.

A split annular member 70 is mounted around ring 60 so that the internal threads 71 on member 70 engage with the threads 62 on ring 60. A ring gear 49 surrounds member 70, as shown in FIGURE 10, and is engageable with the worm gear 48 on the inner end of shaft 44. A split retaining band 74 also surrounds member 70 by slidably engaging with circular grooves 75 adjacent to the ring gear 49. Band 74 includes ears 80 on its upper portion which connect to shaft 44 to retain the worm gear 48 in engagement with the ring gear 49. Flanges 81 on the split band 74 are joined by screws 82 to firmly hold the band in place around member 70. The retaining band 74 thus retains the pipe cutter assembly in working position around pipe section P'.

Member 70 of this embodiment of the pipeline cutting device includes internal guide slots 85 and 86 (FIGURE 8) which are open at the outer end of member 70 and extend partially therethrough in a generally axial direction. Sliding wedges 87 and 88 are positioned within the slots 85 and 86. The inner end of wedges 87 and 88 include projections 89 and 90 which engage with the groove 63 in ring 60 (FIGURES 5 and 6). In addition, grooves 95 and 96 are cut along the angular faces of sliding wedges 87 and 88 (FIGURE 8).

Cutter supports 97 and 98 (FIGURES 5 and 8) are also generally wedge shaped, and include tongues 99 and 100 which extend along the inclined faces of the cutter supports. Tongues 99 and 100 engage with grooves 95 and 96 respectively to retain the cutter supports 97 and 98 within the internal guide slots 85 and 86. This tongue and groove connection between wedges 87 and 88 and the cutter supports 97 and 98 allows the cutter supports to slide relative to the wedges within guide slots 85 and 86 in a direction axial to the pipeline P.

Pipe cutting blades 101 and 102, preferably the rotary disc type, are connected to the outer ends of cutter supports 97 and 98. As illustrated in FIGURES 5 and 6, the pipe cutter 50 of this first embodiment is mounted on pipe section P' so that the cutting blades 101 and 102 engage the pipe section closely adjacent to the inside of the lower body portion 4.

To operate this embodiment of the pipeline cutting device illustrated as the pipe cutter 50, the shaft 44 with worm gear 48 is rotated manually, or with a power tool, from outside the cutter housing 40. Since the retaining band 74 is free to slide within the circular grooves 75, the action of worm gear 48 on the ring gear 49 causes member 70 to revolve about the ring 60. This rotation of member 70 revolves the cutting blades 101 and 102 around the periphery of the pipe section P', to begin the pipe cutting operation.

As member 70 rotates it is prevented from moving axially along the pipe section P' by shoulder 56, and by the resistance of shaft 44 extending through the bearing 45 in the cutter housing 40. The rotation of member 70 thus imparts axial motion to the ring 60 by the action of threads 71 on threads 62, which are designed to advance ring 60 axially outward along splines 59 on the sleeve 55 when shaft 44 is rotated in the proper direction.

The axial advance of ring 60 is transferred to the sliding wedges 87 and 88 because the projections 89 and 90 are retained within groove 63 in the outer end of ring 60. As the wedges 87 and 88 advance, the angular faces abut with and slide along the adjacent inclined faces of the cutter supports 97 and 98, to cam the cutter supports and the connected cutting blades 101 and 102 radially into the pipe section P'. The cutter supports 97 and 98 are prevented from excessive axial movement by the engagement of the cutting blades 101 and 102 with the inside of lower body portion 4. The operation of the pipe cutter 50, therefore, feeds the cutting blades 101 and 102 radially into the pipe section P' while simultaneously revolving the blades about the pipe section, and severs the pipeline P rapidly and efficiently.

When installing a valve in a pipeline in accordance with this embodiment of the invention, the pipe cutters 50 are first mounted on the pipeline P at pipe section P', the location where the valve is to be installed. This is accomplished by securing split sleeve 55 to the pipe section P' by tightening screws 57 and set screws 58. Split ring 60 is then placed about sleeve 55 with spaced slots 61 on the ring engaging with the splines 59 on the sleeve. Split member 70, including the sliding wedges 87 and 88 and the cutter supports 97 and 98, is then mounted around ring 60 so that threads 62 and 71 cooperate and so that projections 89 and 90 of the sliding wedges 87 and 88 engage with groove 63 in the periphery of ring 60. As seen in FIGURES 5 and 6, the inner end of member 70 abuts with the collar 56 of the sleeve 55, and is thereby prevented from moving inwardly along the pipe section P'.

The worm gear 48 is next engaged with the ring gear 49, and retaining band 74 is placed within grooves 75 in the member 70. Screws 82 are tightened to join the flanges 81 of the retaining band. The pipe cutter 50 is now mounted on pipe section P' with the cutting blades 101 and 102 in position to sever the pipe section P' from the pipeline P. As clearly shown in FIGURE 3, the pipe cutters 50 are spaced apart on the pipe section P' so that they may be enclosed within compartment 5 by the first body portion 4 of the valve body 1. Shafts 44 can now be rotated, if desired, until the cutting blades 101 and 102 have cut part way through the pipeline.

The valve body 1 can now be mounted upon the pipeline P so that the first body portion 4 encloses the pipe cutters 50, and the connection between pipeline P and the valve body 1 is made impervious by welds 2, as shown in FIGURE 3. A gusset strap 3 can be welded to the pipeline and extended under the valve body 1 to add extra strength to the apparatus.

With the valve body 1 installed as described above, the shafts 44 which extend through opening 43 in the first body portion 4, are placed through bearings 45 and braces 46 on the cutter housing 40. The cutter housing 40 is then fastened to the first body portion 4 by bolts 41. When the cutter housing 40 is in position it defines a fluid-tight chamber 42 which is in communication with compartment 5 due to the opening 43 in the side of the first body portion.

Valve seat housing 23, including valve seats 27, is next bolted to the first body portion 4 by bolts 24, on the side opposite the cutter housing 40, so that guide rails 29 extend through the opening 25 into compartment 5. The valve seat housing 23 thus defines a fluid-tight chamber 26 which is also in communication with compartment 5 through the opening 25.

With the apparatus installed on the pipeline P as above described, the pipe section P' is completely enclosed. Therefore, the valve may be installed in the pipeline without interrupting the flow of material through the line.

Shafts 44 may now be rotated until pipe section P' is completely severed from pipeline P by the pipe cutters 50. The severed pipe section is then removed to prepare compartment 5 for the placement of the valve seats 27 and the valve plate 14. In this embodiment, the shafts 44 can be retracted through bearings 45 to remove the cutters 50 and the severed pipe section P' from compartment 5 into the fluid-tight chamber 42 defined by the cutter housing 40, as shown in FIGURE 12.

After pipe section P' is removed into chamber 42, the actuator 30 can be rotated from outside the valve seat housing 23 to slide the valve seats 27 along the guide rails 29 into compartment 5. The detent 39 on the actuator 30 insures that the valve seats 27 are in proper position within the compartment 5, with the apertures 35 aligned with the pipeline P. Bolts 37 are then extended through the first body portion 4 to engage in threaded holes 36 on the valve seats 27. The valve seats are thus securely held within compartment 5, with the inside faces 32 of valve seats 27 sufficiently spaced to receive the valve plate 14 therebetween.

The valve plate 14 is now lowered into compartment 5 between the inside faces of the valve seats 27 by manually rotating handle 16. The channel guides 21 in the valve housing 11 accurately guide the valve plate 14 into place between the valve seats.

The installation of the valve 14 is thereby completed without interrupting the flow of material in the pipeline P. Further, the valve 14 is installed without any loss of the material flowing through the pipeline, except that which accumulates in the valve body during the installation. This accumulated material can be bled out of the valve body through petcock 110 if the material is liquid, or blown off through escape valve 111 if it is gaseous.

With the valve installation completed, the valve seat housing 23 and the cutter housing 40 can be removed from the valve body 1 and replaced by plates 120 and 121, as shown in FIGURE 13. The valve body 1 thus provides a fluid-tight enclosure for the newly installed valve.

FIGURES 15 through 22 illustrate a modification of the abovedescribed valve apparatus, and further illustrate a second embodiment of the improved pipeline cutting device which operates to sever both ends of the pipeline section P'. In FIGURES 15 through 22 similar elements have been indicated by the same reference numerals as hereinbefore.

Figure 15:
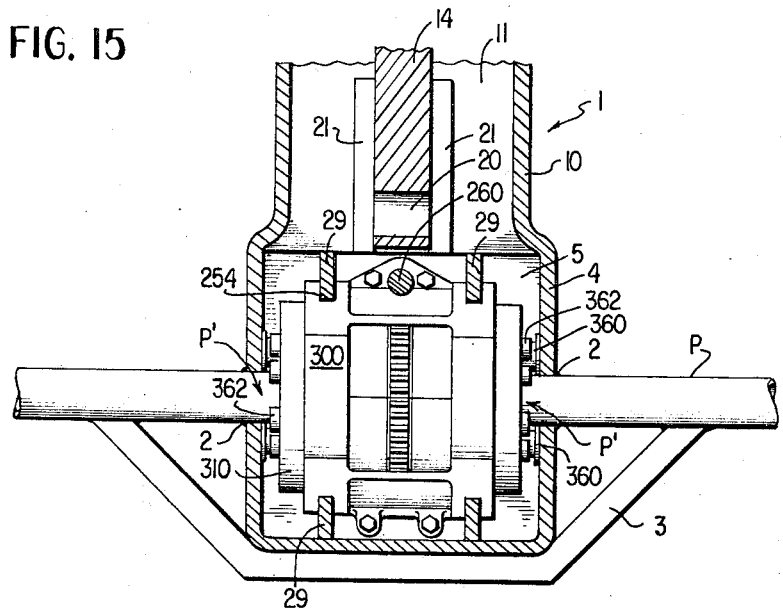
FIGURE 15 is a partial sectional view of another embodiment of the valve appaartus showing the valve in the upper position and showing a second embodiment of the improved pipeline cutter in place on the pipeline.

Referring initially to FIGURE 15 to describe this second embodiment, the valve body 1 is again shown as mounted at the desired location upon pipeline P and secured in position by welds 2. The gusset strap 3 is also shown attached to the pipeline P for rigidity, as hereinbefore described, and the pipe section P' to be severed from the pipeline shown extending through the compartment 5. In addition, the valve housing 11 defined by the second body portion 10 may house a wedge type valve plate 14, as described previously. This valve plate 14 may be maintained in proper position by the channel guides 21, and includes an aperture 20 which is to be aligned with the pipeline P when the valve is in an open position.

Figure 20:
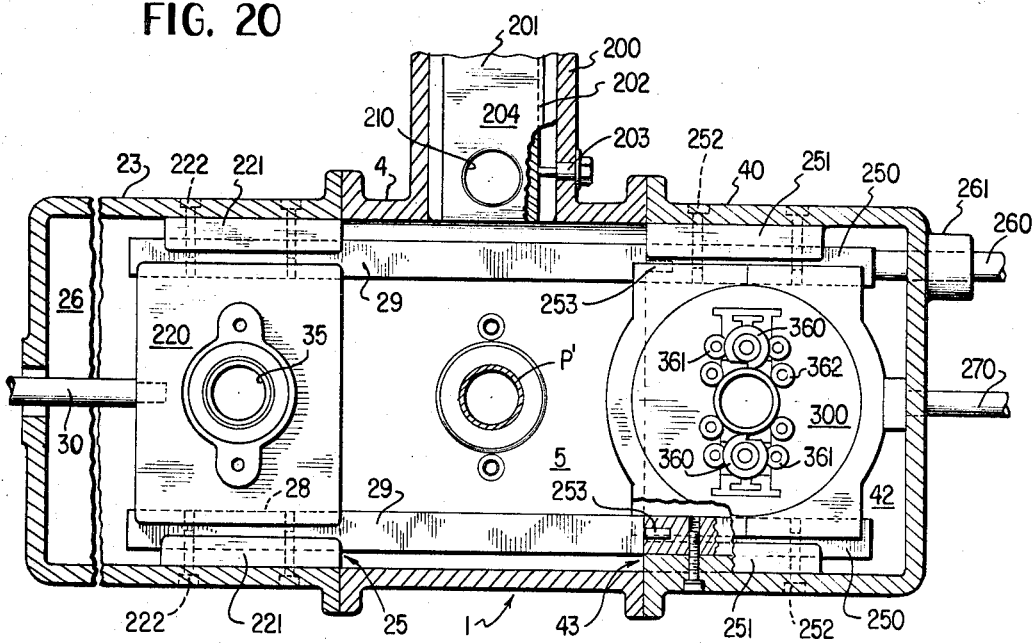
FIGURE 20 is a partial sectional view of this second embodiment of the valve apparatus taken transverse to the pipeline showing the second embodiment of the cutter positioned within the cutter housing.
Figure 21:
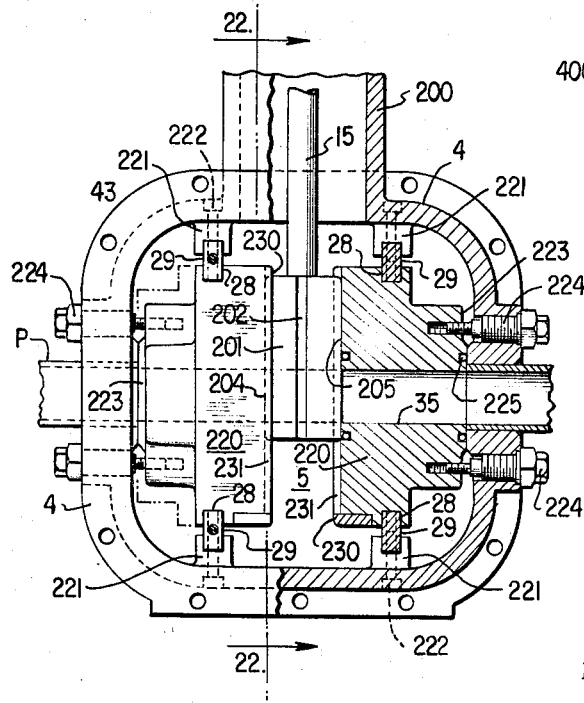
FIGURE 21 is a partial sectional view of the embodiment of FIGURE 20 taken parallel to the pipeline showing the valve seats and valve in place on the pipeline.
Figure 22:
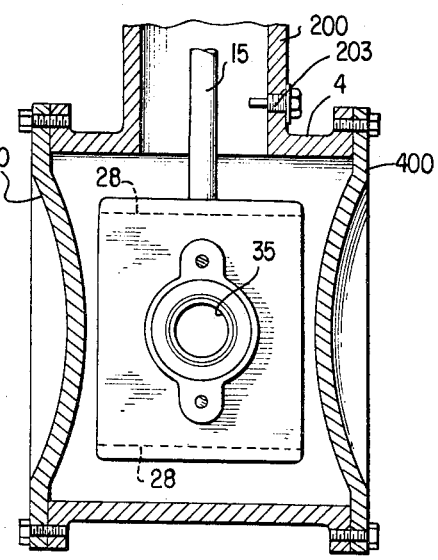
FIGURE 22 is a sectional view taken along line 22—22 in FIGURE 21, illustrating closure plates attached to the side of the valve body.

If preferred, the valve apparatus instead may be provided with a circular valve housing 200, as illustrated in FIGURES 20 through 22. This circular housing 200 will receive the substantially cylindrical valve plate 201, and will function as the guide means to retain the valve in proper position above the pipeline P before installation of the valve is completed. As seen in FIGURE 21, a suitable valve stem 15 is connected to the valve 201, and this valve is preferably provided with a longitudinal groove 202 which receives detent 203. The groove 202 and detent 203 thus cooperate to restrain the valve 201 from rotating within the cylindrical housing 200 as the valve is lowered into alignment with pipeline P, but the detent 203 does not obstruct the downward movement of the valve into compartment 5.

In this embodiment, two opposed plane surfaces 204 and 205 are cut from the cylindrical valve 201, as seen in FIGURE 21, so that the valve may be brought into fluid-tight association with valve seats, as described in more detail hereinafter. In addition, the valve 201 is provided with an aperture 210, preferably transverse to the plane surfaces 204 and 205, which is to be aligned with the pipeline P when the valve is opened.

The valve apparatus of this second embodiment also includes valve seat housing 23, hereinbefore described, which forms the fluid-tight chamber 26, as seen in FIGURE 20. Valve seats 220 (FIGURES 20 and 21) are movably mounted within chamber 26 and are provided with grooves 28 which engage with the guide rails 29 secured to bosses 221 by screws 222. As illustrated in FIGURE 20, the rails 29 extend from within chamber 26 through opening 25 into the compartment 5, and terminate adjacent to opening 43 on the opposite side of the compartment.

Each valve seat 220 is also provided with a suitable aperture 35 which is to be coaxially aligned with pipeline P when the seats are moved inwardly along the guide rails 29 by actuator 30, as described above. After seats 220 are moved into the proper position within compartment 5, their outer faces 223 are secured to valve body portion 4 by suitable bolts 224, and a sealing gasket 225 can be interposed between each seat and valve body to insure a fluid-tight connection (FIGURE 21). The inner faces 230 of seats 220 are thus spaced to receive the cylindrical valve 201 therebetween.

In this second embodiment, each inner face 230 of the valve seats 220 is provided with a groove 231, as seen in FIGURE 21, so that the opposed plane surfaces 204 and 205 of the cylindrical valve 201 make sliding contact with the seats within these grooves as the valve 201 is lowered into compartment 5. The grooves 231 thereby operate as guide means for the valve 201 during the installation and the subsequent operation of the valve apparatus, and insure that the connection between the valve seats and the valve is fluid-impervious.

This second embodiment of the valve apparatus also includes a cutter housing 40, hereinbefore described, which defines the fluid-tight chamber 42 in communication with compartment 5 through the opening 43. Cutter housing 40 is of sufficient size to receive a second embodiment of the improved pipe cutting device 300, as shown in FIGURE 20.

Figure 16:
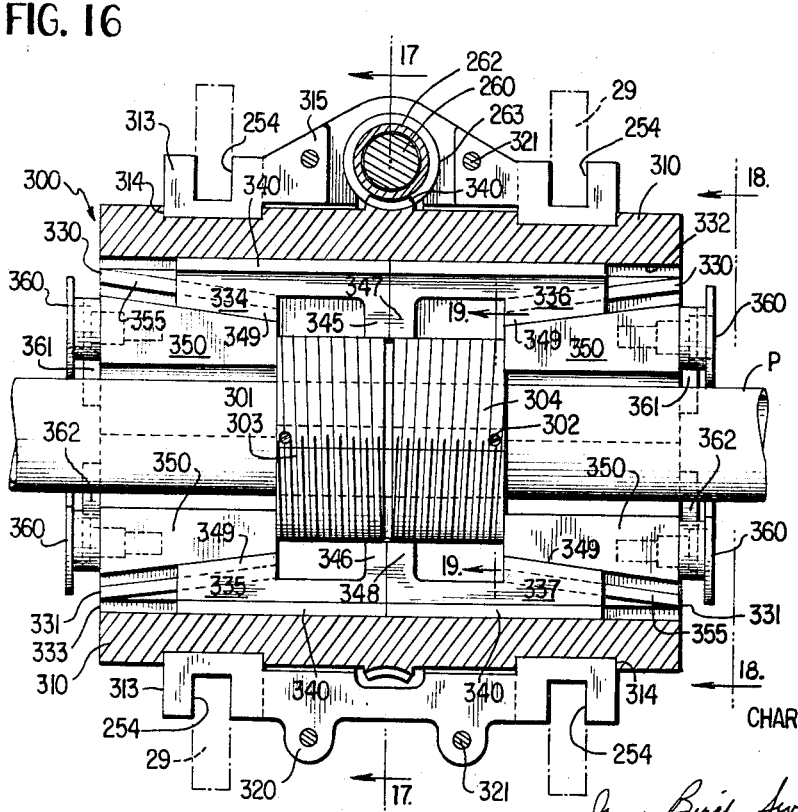
FIGURE 16 is a sectional view illustrating the second embodiment of the improved pipeline cutter mounted on the pipeline in a position to begin cutting.

In this second embodiment the cutter 300 is movably mounted within cutter housing 40 upon a pair of parallel guide rails 250 (FIGURE 20) which are secured in place on bosses 251 by suitable screws 252. These rails 250 extend from within housing 40 toward the opening 43 and are preferably aligned with the above-mentioned guide rails 29 so that the rails 29 and 250 form continuous guiding means which extend from the valve seat housing 23 through the compartment 5 and into the cutter housing 40. As illustrated in FIGURE 20, the ends of guide rails 29 adjacent to opening 43 may be provided with pins 253 engageable in corresponding slots in the adjacent ends of rails 250 to key rails 29 and 250 together and insure that the rails are retained in proper alignment. FIGURES 15 and 16 show that the pipe cutter 300 in this embodiment is provided with grooves 254 which slidably engage with the guide rails 250 and 29.

The continuous guiding means thus formed by aligned rails 29 and 250 greatly facilitates the valve installing operation by supporting the pipe cutter 300 within the compartment 5 during the cutting operation, and by guiding the retraction of the cutter and severed pipe section into the cutter housing 40 after the cutting operation is completed. The continuous guiding means formed by rails 29 and 250 also guides the valve seats 220 into proper position within compartment 5 during the valve installing operation.

To operate the cutter 300 from the exterior of the valve apparatus, a rotatable shaft 260 extends toward compartment 5, preferably through the cutter housing 40. A suitable bearing 261 can be positioned in the cutter housing 40 to provide a fluid-impervious connection between the housing and shaft 260, and to allow the shaft 260 to be axially shifted within the chamber 42. The outer end of shaft 260 may be provided with means, such as a hand wheel, by which the shaft may be rotated, and the inner end of shaft 260 includes a worm gear 262 which cooperates with a ring gear 263 on the pipe cutter 300, as shown in FIGURE 17.

If desired, a second shaft 270 may be extended through cutter housing 40 in fluid-tight arrangement so that it also may be axially shifted within the chamber 42, as shown in FIGURE 20. The inner end of shaft 270 is connected to the cutter 300, so that the cutter may be retracted into the cutter housing 40 along the guide rails 250 and 29 by exerting an axial pulling force on the shaft 270. By this arrangement, the force necessary to move the cutter 300 is exerted on the shaft 270 instead of on the shaft 260, and the possibility of damage to the gears 262 and 263 during the installing operation is reduced.

More fully described, this modified pipe cutter 300 includes a split sleeve 301 which may be mounted around section P' of the pipeline within compartment 5. Set screws 302 (FIGURE 19) extend radially through sleeve 301 to hold the halves of the sleeve together, and to prevent the sleeve from rotating or sliding axially with respect to the pipe section P'. FIGURE 16 illustrates that in this embodiment the periphery of sleeve 301 includes external threads, which are preferably divided into a first segment 303 of right-hand threads on one end of the sleeve and a second segment 304 of left-hand threads on the other end of the sleeve. The function of these opposed threads 303 and 304 will be described in more detail hereinbelow.

Figure 17:
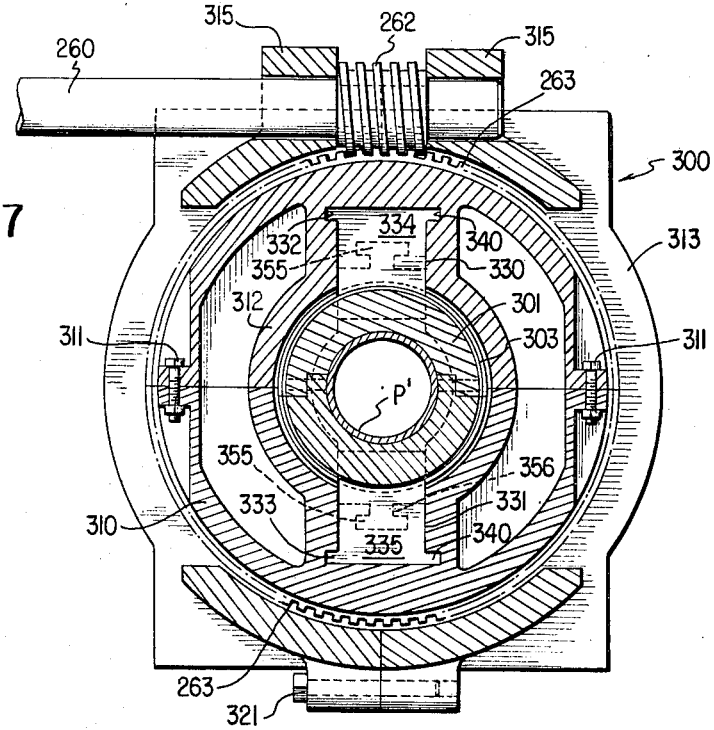
FIGURE 17 is a sectional view taken along the line 17—17 in FIGURE 16.
Figure 18:
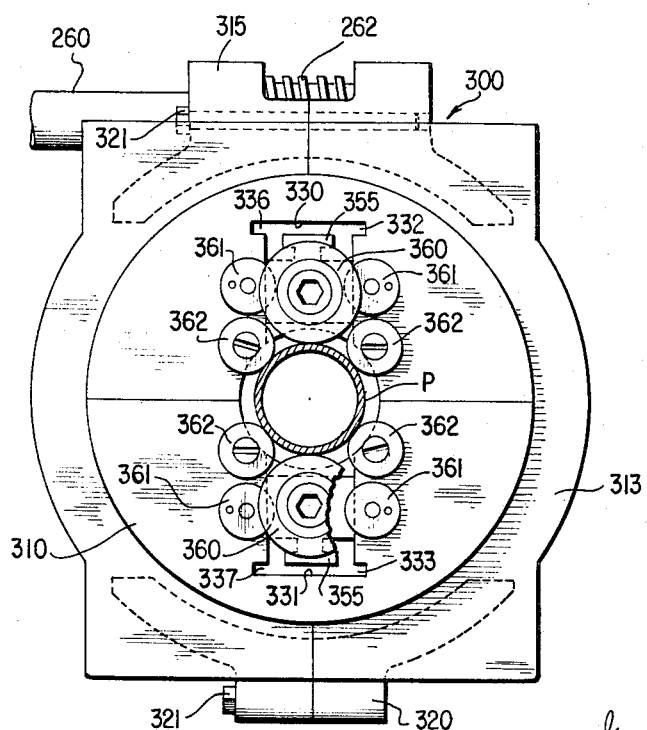
FIGURE 18 is a sectional view taken along the line 18—18 in FIGURE 16.
Figure 19:
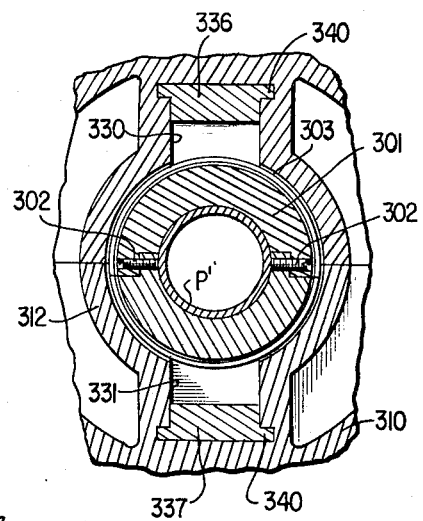
FIGURE 19 is a fragmentary sectional view taken along the line 19—19 in FIGURE 16.

This modified pipe cutter 300 also includes a split annular member 310 which encircles the sleeve 301, as seen in FIGURES 16 and 17. Member 310 is retained in position around the sleeve by bolts 311 (FIGURE 17) and includes an inner circular portion 312 which encloses sleeve 301 to protect the threads 303 and 304 from damage. In addition, the ring gear 263 on the periphery of annular member 310 is engageable with the worm gear 262 on the shaft 260, as hereinbefore described, and operates to rotate the member 310 around the sleeve 301 during the cutting operation. Member 310 is retained around the sleeve 301 by a split band 313 engaged in the circular grooves 314 in the member (FIGURE 16). The upper portion of band 313 includes ears 315 to retain gear 262 in engagement with the ring gear 263, and the lower portion of band 313 includes flanges 320. Bolts 321 firmly hold the band 313 in place around the member 310. Band 313 in this embodiment also includes the grooves 254 which engage with the guide rails 29 and 250 to guide the cutter 300 during the installation of the valve.

Annular member 310 of this embodiment of the pipeline cutting device further includes axial guide slots 330 and 331 which extend through the member and which communicate with both threaded segments 303 and 304 on the sleeve 301. A first set of sliding wedges 334 and 335 is movably mounted within guide slots 330 and 331, respectively, adjacent to the first threaded segment 303 on the sleeve 301, as seen in FIGURE 16. In addition, a second set of sliding wedges 336 and 337 is similarly mounted within slots 330, and 331, respectively, adjacent to the second threaded segment 304 on the other end of the sleeve 301. As seen in FIGURE 17, the slot 330 is provided with a groove 332, slot 331 is provided with groove 333, and the sliding wedges are provided with corresponding tongues, indicated generally as 340. Tongues 340 engage within the grooves 332 and 333 and retain the wedges within the axial guide slots 330 and 331 (FIGURE 19), so that the wedges may move axially with respect to member 310 within the guide slots 330 and 331.

FIGURE 16 further illustrates that the inner end of wedges 334 and 335 include inward projections 345 and 346, respectively, which threadably engage with the first threaded segment 303 on the sleeve 301. The inner end of wedges 336 and 337 also include similar projections 347 and 348 which threadably engage with the second threaded segment 304 of sleeve 301. As will be described in more detail hereinafter, this arrangement of the sliding wedges causes the threaded segment 303 to force wedges 334 and 335 outwardly to the left in FIGURE 16, and threaded segment 304 to force wedges 336 and 337 outwardly to the right in FIGURE 16, during the pipe cutting operation.

FIGURE 16 also shows that the outer ends of each wedge includes an angular face 349 which is in sliding contact with a corresponding angular face on each of the similar pipe cutter supports 350. These cutter supports 350 are thus movably mounted within the guide slots 330 and 331 adjacent to the wedges, and are retained therein by tongues 355 which engage with grooves 356 on the angular face 349 of each sliding wedge.

Pipe cutting blades 360, preferably the rotary disc type, are connected to the outer ends of cutter supports 350, as illustrated in FIGURE 16, and suitable detents 361 may be provided on the ends of member 310 to limit the outward axial movement of the cutter supports 350 during the cutting operation. FIGURE 15 shows that the blades 360 are positioned on the pipe cutting device 300 closely adjacent to the inside walls of the lower body portion 4 so that the entire pipe section P', which extends through the compartment 5, will be severed by the cutting blades, and so that both ends of the pipe section P' are cut simultaneously. The pipe cutter 300 may also include pipe rollers 362 positioned adjacent to the blades 360 to grip the pipe section P' during the cutting operation.

To secure this modified pipe cutting device 300 on the pipeline P, the split sleeve 301 is engaged around the pipe section P' where the valve is to be installed, and the sleeve is held in place on the pipe section P' by the set screws 302. The split annular member 310, including the above-described sliding wedges and cutter supports, is then placed around pipe section P' so that it encircles the sleeve 301, and the split band 313 is placed around member 310 to hold the member in position on the pipe section P'. The threads on the inward projections 345 and 346 of sliding wedges 334 and 335, respectively, are thereby engaged with the first threaded segment 303 on the sleeve 301, and the threads on projections 347 and 348 of wedges 336 nd 337, respectively, are brought into engagement with the second threaded portion 304 of sleeve 301. The pipe cutter 300 is thus secured to the pipeline in a position to begin the cutting operation.

After the cutter 300 is positioned on the pipeline P, the second embodiment of the valve installing apparatus may be placed around cutter 300 before the pipe section P' is completely severed from the pipeline. As hereinbefore described, the valve body 1 is thus welded or otherwise secured to the pipeline P, and the cutter housing 40 and valve seat housing 23 are removably connected to the lower portion 4 of the valve body, as seen in FIGURE 20. When attaching the valve seat housing 23 in this second embodiment, the guide rails 29 are extended through the grooves 254 in the cutting device 300 and the ends of rails 29 are keyed to the corresponding rails 250 which are positioned within the cutter housing 40. The aligned guide rails 29 and 250 therefore provide continuous guiding means for the valve seat 220 and the pipe cutter 300 in this second embodiment. In addition, when the cutter housing 40 is attached to the valve body 1, the shafts 260 and 270 are extended outwardly through the cutter housing so that the cutting device 300 may be operated from the exterior of the valve installing apparatus.

To begin the cutting operation with this modified cutting device 300, the shaft 260 is rotated manually, or with a power tool, from outside the cutter housing 40. The action of worm gear 262 on the ring gear 263 causes the annular member 310 to rotate with respect to the fixed sleeve 301. The first threaded segment 303 on the sleeve 301 thereby operates to force the sliding wedges 334 and 335 outwardly, to the left in FIGURE 16, along the axial guide slots 330 and 331. In addition, the second threaded segment 304 of the sleeve 301 simultaneously forces the wedges 336 and 337 outwardly, to the right in FIGURE 16, along the guide slots 330 and 331. This outward movement of the sliding wedges caused by the rotation of the annular member 310 cams the cutter supports 350, and the attached cutting blades 360, radially into the pipe section P', to feed the cutters 360 into the pipe during the cutting operation. It is apparent from the above description that the rotation of the single shaft 260 in this modified cutting device 300 operates to quickly sever both ends of the pipe section P' simultaneously.

After pipe section P' is completely severed from the pipeline P, the pipe cutting device 300 and the severed pipe section P' are retracted into the fluid-tight chamber 42 by an axial pull on the shafts 260 and 270. As seen from FIGURE 20, this retraction into chamber 42 is facilitated by the continuous guiding means formed by rails 29 and 250, which guide the cutting device 300 into the chamber. The actuator 30 is then operated from outside the valve seat housing 23 to move the valve seats 220 along guide rails 29 into the compartment 5. Suitable bolts 224 can then be extended through the lower body portion 4 to engage the valve seats 220 and to retain the seats in a position within the compartment 5 to receive the valve plate 201 therebetween.

The valve installation is completed by lowering the valve plate 201 into the compartment 5 between the inside faces of the seats 220, such as by rotation of the valve stem 15. In this second embodiment, as shown in FIGURE 21, the valve plate 201 is received between the valve seats 220 in the grooves 231 provided in the inside faces of the valve seats. The connection between the valve seats and the valve is thus fluid-impervious.

The installation of the valve is thereby completed without interrupting the flow of material through the pipeline P, and with minimal loss of the material flowing through the pipeline. With the valve installation completed, the valve seat housing 23 and the cutter housing 40 may be removed from the valve body 1 and replaced by suitable side plates 400, as shown in FIGURE 22, which provide a completely fluid-tight enclosure for the newly installed valve.

In view of the foregoing disclosufire, other modifications of this invention may occur to those skilled in the art. Accordingly, the scope of the invention is limited solely by the appended claims.

What is claimed is:

1. Apparatus for installing a valve in a pipeline comprising the combination of
 a valve body, said body being separable into parts to permit assembly about said pipeline in fluid-impervious relationship therewith,
 a first portion of said body defining a compartment through which said pipeline may extend,
 a second portion of said body defining a valve housing in communication with said first portion,
 valve means mounted in said valve housing and movable into said compartment,
 a cutter housing connected to said body defining a fluid-tight first chamber in communication with said compartment,
 pipe cutting means engageable in cutting relationship with the pipeline within said compartment to sever a section of said pipeline,
 means to retract said pipe cutting means and the severed section of said pipe into said cutter housing,
 a valve seat housing connected to said body defining a fluid-tight second chamber in communication with said compartment,
 valve seat means movably mounted within said second chamber, said seat means containing an aperture for coaxial alignment with the said pipeline,
 means operable from the exterior of said valve seat housing to move said seat means into said compartment to permit said aperture to be coaxially aligned with said pipeline after said section of said pipeline is severed and removed therefrom,
 and means to retain said seat means within said compartment in coaxial alignment with said pipeline so that said seat means receives said valve means within said compartment to form a fluid-tight valve in said pipeline.

2. Apparatus for installing a valve in a pipeline according to claim 1 wherein said cutter housing and said valve seat housing are removably connected to diametrically opposite sides of said valve body to permit said cutter housing and valve seat housing to be removed and replaced by covers after installation of the valve.

3. Apparatus for installing a valve in a pipeline according to claim 1 wherein said pipe cutting means is engageable with said pipeline and mountable thereon for rotation about said pipeline within said compartment, said cutter means including means operable from the exterior of said cutter housing to rotate said cutting means about said pipeline and to feed said cutting means radially into said pipeline during the cutting operation.

4. Apparatus for installing a valve in a pipeline according to claim 1 wherein said valve means comprises a valve plate including a valve aperture therein, said valve aperture being alignable with said pipeline when said valve plate is lowered into said compartment, and said valve seat means comprises a pair of seats, each of said seats including apertures therein being alignable with said pipeline, said seats being spaced apart to receive said valve means therebetween when said seats are moved into said compartment.

5. Apparatus for installing a valve in a pipeline according to claim 1 wherein said pipe cutter comprises an annular member removably securable to said pipeline, means for rotating said member about said pipeline within said compartment, a cutter support with a cutting blade attached thereto, said cutter support maintaining said cutting blade in engagement with said pipeline and being connected to said member for rotation thereby said member including camming means engaged with said cutter support to cam said cutting blades radially into said pipeline as said member is rotated about said pipeline.

6. Apparatus for installing a valve in a pipeline according to claim 5 wherein said pipe cutter includes a sliding wedge supported within an axial slot in said member in sliding contact with said cutter support, and means to advance said wedge axially toward said cutter support when said member is rotated about said pipeline so that said wedge cams said cutter support and said cutting blade radially into said pipeline.

7. Apparatus for installing a valve in a pipeline according to claim 1 wherein said pipe cutter comprises a sleeve engageable with said pipe section within said compartment, said sleeve including external threads, an annular member encircling said sleeve and including gear means operable to rotate said member about said sleeve, said member further including an axial slot in communication with said sleeve, a sliding wedge movably mounted within said axial slot for rotation with said member, a cutter support including a cutting blade said support being movably mounted in said slot adjacent to and in sliding contact with said wedge so that said blade is adjacent to said pipeline and said support and blade are rotated with said member, the inner end of said wedge including a threaded portion operably engageable with said external threads on said sleeve to move said wedge axially within said slot when said member is rotated about said sleeve so that said wedge cams said cutter support and said cutting blade radially into said pipeline.

8. Apparatus for installing a valve in a pipeline according to claim 1 wherein said pipe cutter comprises, a sleeve engageable with said pipe section within said compartment, said sleeve including a first threaded segment of right-hand external threads on its one end and a second threaded segment of left-hand external threads on its other end, an annular member encircling said sleeve and including gear means operable to rotate said member about said sleeve, said member further including an axial slot in communication with said first and second threaded segments on said sleeve, a first sliding wedge movably mounted within said axial slot adjacent to said first threaded segment on said sleeve and a second sliding wedge movably mounted within said axial slot adjacent to said second threaded segment on said sleeve, a first cutter support including a first cutting blade, said first support being movably mounted in said axial slot adjacent to and in sliding contact with said first wedge so that said first blade is adjacent to one end of said pipe section to be severed from said pipeline, a second cutter support including a second cutting blade, said second support being movably mounted in said axial slot adjacent to and in sliding contact with said second wedge so that said second blade is adjacent to the other end of said pipe section to be severed from said pipeline, said wedges, said cutter supports and said blades being rotatable with said member, the inner end of said first and second wedges including a threaded portion operably engageable with said first and second threaded segments respectively on said sleeve to move said wedges axially within said slot when said member is rotated about said sleeve so that said wedges cam said cutter supports and said cutting blades radially into said pipeline to cut both ends of said pipe section simultaneously.

9. Apparatus for installing a valve in a pipeline comprising the combination of a valve body, said body being separable into parts to permit assembly about said pipeline in fluid-impervious relationship therewith, a first portion of said body defining a compartment through which said pipeline may extend, a second portion of said body defining a valve housing in communication with said first portion, a valve plate including a valve aperture alignable with said pipeline, said valve plate movably mounted within said valve housing substantially transverse to said pipeline, a cutter housing removably connected to said body defining a fluid-tight first chamber in communication with said compartment, a pipe cutter engageable with said pipeline and mountable thereon for rotation about said pipeline within said compartment to sever a section of said pipeline, said cutter including means operable from the exterior of said cutter housing to rotate said cutter about said pipeline and to feed said cutter radially into said pipeline during the cutting operation, means to retract said cutter and the severed pipeline section into said cutter housing, a valve seat housing removably connected to said body defining a fluid-tight second chamber in communication with said compartment, a pair of valve seats movably mounted within said second chamber, each of said seats containing an aperture for coaxial alignment with pipeline, said seats being spaced apart to receive said valve plate therebetween, an actuator operable from the exterior of said seat housing to move said valve seats into said compartment to permit said apertures contained by said seats to be coaxially aligned with said pipeline after said section of said pipeline is severed and removed therefrom, and means to retain said valve seats within said compartment in coaxial alignment with said pipeline so that said valve seats receive said valve plate therebetween to form a fluid-tight valve in said pipeline.

10. Apparatus for installing a valve in a pipeline according to claim 9 including rotatable shaft means removably connected to said pipe cutter to operate said cutter from the exterior of said cutter housing, said shaft means being shiftable to permit removal of said cutter and said section of said pipeline from said compartment into said first chamber after said section of said pipeline is severed therefrom.

11. Apparatus for installing a valve in a pipeline according to claim 9 wherein said valve seats are movably mounted within said second chamber upon guide rails extending toward said compartment.

12. Apparatus for installing a valve in a pipeline according to claim 11 wherein said guide rails extend into said compartment to maintain said apertures in said seats coaxially aligned with said pipeline.

13. Apparatus for installing a valve in a pipeline according to claim 12 wherein said guide rails extend through said compartment and into said first chamber defined by said cutter housing and wherein said pipe cutting means is movably mounted upon said guide rails, said guide rails supporting said cutting means within said compartment and within said cutter housing.

14. Apparatus for installing a valve in a pipeline according to claim 9 wherein said valve housing includes spaced valve guides to receive said valve plate therebetween and to maintain said valve plate transverse to said pipeline.

15. Apparatus for installing a valve in a pipeline according to claim 9 wherein said valve plate is substantially cylindrical and wherein said valve housing is substantially circular to receive said cylindrical valve plate therein.

16. Apparatus for installing a valve in a pipeline according to claim 15 wherein said substantially cylindrical valve plate includes two opposed plane surfaces and wherein said valve aperture extends through said valve plate transverse to said opposed plane surfaces.

17. Apparatus for installing a valve in a pipeline according to claim 9 wherein each of said valve seats includes an inner face having a groove to receive said valve means as said valve means is moved into said compartment to provide a fluid-impervious connection between said seats and said valve means.

18. Apparatus for installing a valve in a pipeline according to claim 9 wherein said valve plate is connected to a valve stem, said stem threadably engaging said body and being operable to move said valve plate into said compartment.

19. Apparatus for installing a valve in a pipeline according to claim 9 wherein said valve seats are retained within said compartment so that said apertures are coaxially aligned with said pipeline by bolts extending through said first portion of said valve body and threadably engaging said seats.

20. Apparatus for installing a valve in a pipeline according to claim 1 wherein said pipe cutter comprises a sleeve engageable with said pipe section within said compartment, a cylindrical ring slidably mounted upon said sleeve, said ring including external threads and further including a circular groove adjacent the outer end of said ring, an annular member engageable with said cylindrical ring, said member including gear means operable to rotate said member about said ring and further including internal threads which cooperate with said external threads on said ring to advance said ring axially along said sleeve when said member is rotated, a sliding wedge movably mounted within an axial slot in the outer end of said member for rotation therewith, a cutter support including a cutting blade, said support being movably mounted in said slot adjacent to and in sliding contact with said wedge so that said blade is adjacent to said pipeline and said support and blade are rotated with said member, said wedge including a projection engageable with said circular groove in said ring so that said wedge is moved axially within said slot when said ring is advanced along said sleeve by the rotation of said member, to cam said cutter support and said cutting blade radially into said pipeline.

21. Apparatus according to claim 20 wherein the periphery of said sleeve includes a plurality of splines axially aligned with said pipeline and engageable with corresponding recesses in said ring to guide the axial advance of said ring along said sleeve.

22. Apparatus according to claim 20 wherein the cutting blade comprises a disc blade rotatably mounted to said cutter support.

References Cited

UNITED STATES PATENTS

| | | | |
|---|---|---|---|
| 940,356 | 11/1909 | Phelps | 137—318 X |
| 1,989,768 | 2/1935 | Nieman | 137—318 X |
| 2,840,100 | 6/1958 | Stephenson | 137—318 |
| 3,108,499 | 10/1963 | Duncan | 137—318 X |

WILLIAM F. O'DEA, *Primary Examiner.*

D. R. MATTHEWS, *Assistant Examiner.*